United States Patent
Lundqvist et al.

(10) Patent No.: US 9,009,765 B2
(45) Date of Patent: Apr. 14, 2015

(54) METHOD AND SERVER FOR FAST CHANNEL CHANGE IN UNICAST-MULTICAST IPTV NETWORKS

(75) Inventors: Thomas Lundqvist, Stockholm (SE); Mats Cedervall, Härnösand (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/980,979

(22) PCT Filed: Jan. 26, 2011

(86) PCT No.: PCT/SE2011/050082
§ 371 (c)(1),
(2), (4) Date: Jul. 22, 2013

(87) PCT Pub. No.: WO2012/102651
PCT Pub. Date: Aug. 2, 2012

(65) Prior Publication Data
US 2013/0332974 A1 Dec. 12, 2013

(51) Int. Cl.
*H04N 7/173* (2011.01)
*H04N 21/6332* (2011.01)
*H04N 21/438* (2011.01)
(Continued)

(52) U.S. Cl.
CPC ....... *H04N 21/6332* (2013.01); *H04N 21/4384* (2013.01); *H04N 21/44209* (2013.01); *H04N 21/6405* (2013.01); *H04N 21/6408* (2013.01)

(58) Field of Classification Search
USPC ....................................... 725/98, 118, 93, 94
See application file for complete search history.

(56) References Cited

U.S. PATENT DOCUMENTS

2005/0081244 A1    4/2005  Barrett et al.
2006/0029096 A1*   2/2006  Babbar et al. ................. 370/466
(Continued)

FOREIGN PATENT DOCUMENTS

EP    1523190 A1    4/2005
EP    1708506 A2   10/2006
(Continued)

OTHER PUBLICATIONS

Ikezaki, M. et al. "An Effective Simple Method to Reduce Bandwidth Usage Over an Access Link in IPTV Multicast Delivery Services." TENCON 2010—2010 IEEE Region 10 Conference, pp. 1460-1465, Nov. 21-24, 2010.
(Continued)

*Primary Examiner* — Nathan Flynn
*Assistant Examiner* — Sumaiya A Chowdhury
(74) *Attorney, Agent, or Firm* — Murphy Bilak & Homiller, PLLC

(57) ABSTRACT

An object with embodiments of the present invention is to achieve a solution for fast channel change that improves bandwidth utilization, wherein the fast channel change is accomplished by initiating a unicast stream until a multicast stream can provide the desired media. The bandwidth utilization is achieved by delaying the multicast session and by terminating the unicast session at the latest when the multicast session starts. The delay of the multicast session is dependent on the network latency. Latency in this context refers to the time passed from when the client sends an IGMP JOIN message until it receives the first packet of the multicast stream.

5 Claims, 6 Drawing Sheets

(51) Int. Cl.
*H04N 21/442* (2011.01)
*H04N 21/6405* (2011.01)
*H04N 21/6408* (2011.01)

(56) References Cited

U.S. PATENT DOCUMENTS

2006/0200574 A1* 9/2006 Pickens et al. ............... 709/231
2010/0229211 A1 9/2010 Lee et al.
2013/0100822 A1* 4/2013 Caillerie et al. ............. 370/241

FOREIGN PATENT DOCUMENTS

| | | | |
|---|---|---|---|
| EP | 1993289 | A1 | 11/2008 |
| KR | 100979482 | B1 | 9/2010 |
| WO | 2010114450 | A1 | 10/2010 |
| WO | 2010114451 | A1 | 10/2010 |
| WO | 2010132210 | A1 | 11/2010 |

OTHER PUBLICATIONS

Lin, J. et al. "The Implementation of Fast Channel Switching in IPTV." Second International Conference on Intelligent Computation Technology and Automation, 2009 (ICICTA '09), vol. 4, pp. 684-688, Oct. 10-11, 2009.

Author Unknown. "Method for Fast Channel Change with IPTV." ip.com Technical Disclosure, IP.com number: IPCOM000141644D, Oct. 11, 2006, available online at: http://ip.com/IPCOM/000141644.

Versteeg, B. et al., "Unicast-Based Rapid Acquisition of Multicast RTP Sessions (17)", AVT, Internet Engineering Task Force, Internet-Draft, Intended status: Standards Track, Nov. 18, 2010, pp. 1-54.

Versteeg, B. et al., "Unicast-Based Rapid Acquisition of Multicast RTP Sessions (3)", AVT, Internet Engineering Task Force, Internet-Draft, Intended status: Standard Track, Apr. 16, 2009, pp. 1-37.

* cited by examiner

METHOD AND SERVER FOR FAST CHANNEL CHANGE IN UNICAST-MULTICAST IPTV NETWORKS

TECHNICAL FIELD

The embodiments of the present invention relates to Internet Protocol TV (IPTV) networks, and in particular to fast channel change in IPTV networks.

BACKGROUND

Internet Protocol TV (IPTV) is a term used when delivering broadcasted TV services over an IP network, typically a broadband access network. Currently the predominant IPTV service is Broadcast TV, in which the normal non-IPTV channels, as well as additional channels with low penetration are transmitted over the broadband network from the super headend down to the end-user's set top box (STB). In order to minimize the bandwidth required for these transmissions it is desirable to use multicast techniques through the network. When the user switches channel the STB then sends out an Internet Group Management Protocol (IGMP) message to leave the current multicast channel and join a new multicast channel. In IGMP version 3 this is done in the same message while in previous versions of IGMP the leave and join are sent in two separate messages.

The multicast group that the STB joins contains streams with MPEG frames. There are different frames in MPEG, so-called I-frames which contain a full picture, P-frames contain incremental extrapolation information, and B-frames contain interpolation information. Since B and P frames depend on adjacent frames it is necessary that the STB receives a full I-frame before frames of a new channel can be decoded. This means that the average time for switching between channels will depend on the distance in time between I-frames. Typically for mpeg-2 the distance is around 0.5 seconds and for mpeg-4 part 10 it can be up to several seconds.

Other sources of channel switching delay relates to the buffer in the STB and network equipment, the time it takes for performing IGMP LEAVE/JOIN and other processing.

In order to alleviate the problem with channel switching delay there are various solutions existing today. One solution is to start a unicast session for the new channel to get the frames of the new channel down as fast as possible, and then performing a switch to the original multicast session when synchronization is possible. This solution implies overlapping unicast and multicast streams, since the unicast stream and the original multicast stream are transmitted simultaneously before the switch to the original multicast stream can be performed.

Overlapping unicast and multicast streams is an important limitation that typical fast channel change solutions based on unicast-based rapid acquisition of multicast streams techniques have because the overlapping streams require extra bandwidth. Even small overlaps of unicast and multicast sessions may severely impact the end-user experience, or significantly limit the efficiency of the network capacity utilization.

SUMMARY

It is desired to solve the problem with overlapping streams to save bandwidth.

Thus an object with embodiments of the present invention is to achieve a solution for fast channel change (FCC) that improves bandwidth utilization wherein the fast channel change is accomplished by initiating a unicast stream until a FCC multicast stream can provide the desired media. The FCC multicast stream in this context refers to a delayed version of a multicast stream. The original multicast stream refers to a live and non-delayed multicast stream.

The bandwidth utilization is achieved by delaying the FCC multicast stream with respect to an original multicast stream and by terminating the unicast stream at the latest when the FCC multicast stream starts. The delay of the FCC multicast stream is dependent on the network latency. Latency in this context refers to the time passed from when the client sends an IGMP JOIN message until it receives the first packet of the FCC multicast stream.

According to a first aspect of embodiments of the present invention, a method in a server for FCC in an IPTV network is provided. A fast channel change to a channel is facilitated by providing a unicast stream of said channel before joining a FCC multicast stream with said channel and wherein information of network latency is known. In the method, a delay of the FCC multicast stream is determined dependent on the at least one network latency. The FCC multicast stream is delayed with respect to an original multicast stream of said channel with the determined delay and the unicast stream is controlled to terminate at the latest when the delayed multicast stream starts.

According to a second aspect of embodiments of the present invention, a server for fast channel change in an IPTV network is provided. The server is configured to facilitate a fast channel change to a channel by providing a unicast stream of said channel before joining a FCC multicast stream with said channel and a maximum network latency and a minimum network latency is known. The server comprises a processor configured to determine a delay of the FCC multicast stream dependent on the maximum and the minimum network latency, to delay the FCC multicast stream with respect to an original multicast stream of said channel. Further the server is configured to control the unicast stream to terminate at the latest when the delayed multicast stream starts.

Overlapping unicast and multicast streams is an important limitation that typical fast channel change solutions based on unicast-based rapid acquisition of multicast streams techniques have. The embodiments provide a solution for optimizing the bandwidth utilization for fast channel change and specifically to avoid the overlap of unicast and multicast streams. The advantages are that the bandwidth requirements related to FCC are considerably reduced.

DETAILED DESCRIPTION

In the embodiments of the present invention it is assumed that a fast channel change (FCC) solution is provided where the new channel is started by initiating a unicast stream of the new channel until a multicast stream can provide the new channel to a client. The client may also be refereed to as a set-top box (STB).

By utilizing the embodiments of the present invention it is possible to optimize Fast Channel Change (FCC) bandwidth utilization, and to avoid the overlap of unicast and multicast streams during the FCC operation.

It can be assumed that IGMP network latency is known. This latency information is used in such manner that the probability of overlapping unicast and multicast streams during the channel change operation is vastly reduced. Determining the IGMP latency in a given network is commonly measured by monitoring the traffic at a selection of connecting and routing points. Most operators of commercial IP networks perform such monitoring on regular basis by using professional network monitoring products.

Further, the maximum (max) and minimum (min) latency of the IGMP JOIN message is known to the FCC server. Latency in this context refers to the time passed from when the client sends an IGMP JOIN message until it receives the first packet of the multicast stream. A complicating factor when mitigating the overlap of unicast and multicast is the variation of IGMP latency. A solution that does not take the variation into account is forced to either complement with a frequent and arbitrary use of retransmissions, and/or face significant risk of overlapping unicast and multicast streams. This aspect is addressed according to the embodiments by that the FCC Server assumes at least the difference in max and min IGMP latency of the complete network when calculating the size of the unicast stream and delaying the multicast stream.

Figure 1:
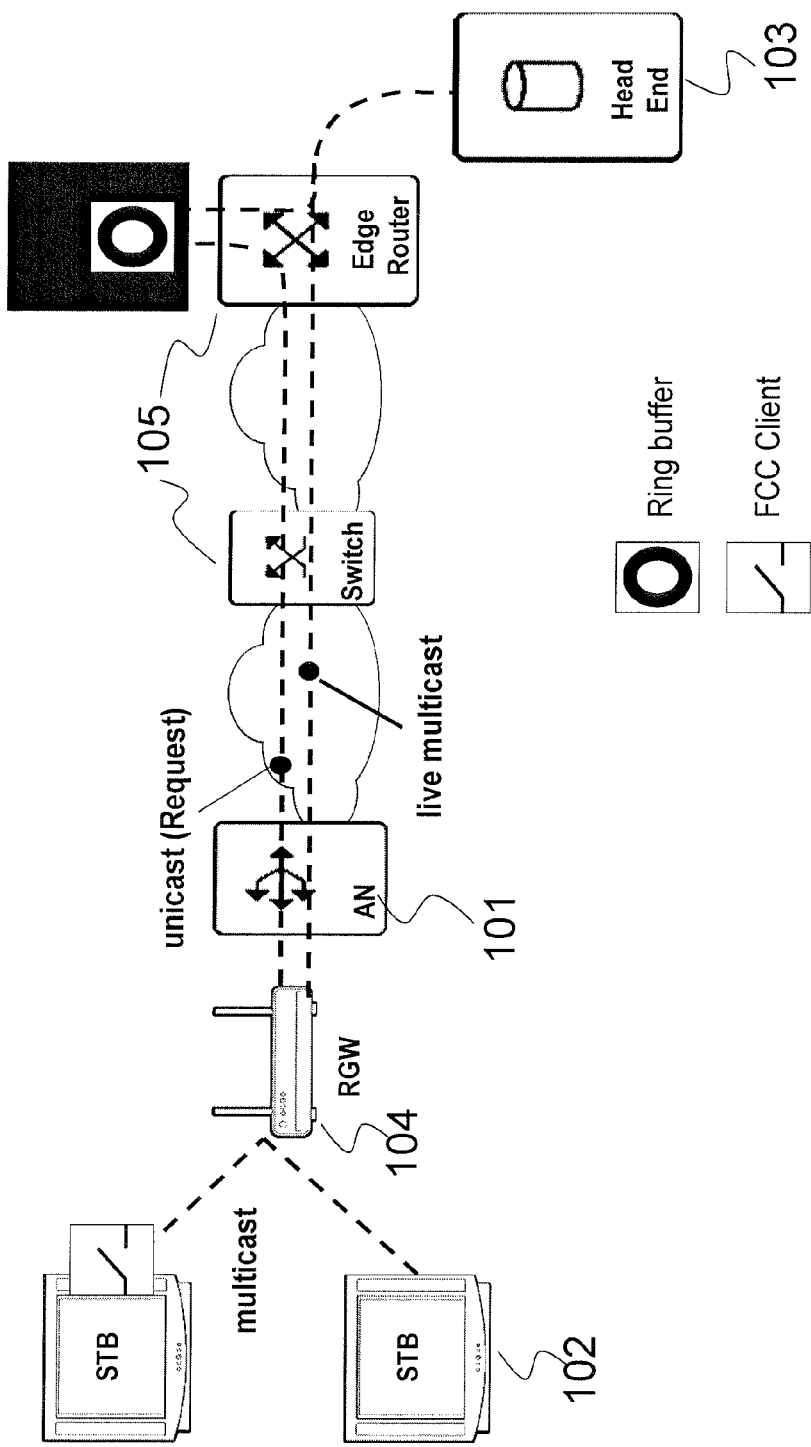
FIG. 1 shows an IPTV network wherein the embodiments of the present invention may be implemented.

FIG. 1 illustrates an IPTV system with fast channel change capability wherein the embodiments can be implemented.

An access node (AN) 101 is the last node in the operators network towards the subscriber, in the Digital Subscriber Line (DSL) case, the AN is a Digital Subscriber Line Multiplexer (DSLAM). A Head-end server is the main place where multicast video streams are sent from. The FCC server (not shown) is normally placed close to the Head-end server 103 but it can be located in many levels of the network in order to save network bandwidth. If the FCC Server is close to the AN 101 more servers are required, if the server is closer to the Head-end more network bandwidth is utilized. Where to place the FCC Server is therefore a tradeoff between bandwidth cost and server cost.

The device that terminates the IPTV multicast streams is referred to as Set-Top-Box (STB) 102. The home part of the FCC solution can be implemented in the STB 102 or in the Residential Gateway (RGW) 104.

Switches and routers 105 shown in FIG. 1 are standard equipment supporting multicast, including IGMP.

By measuring the max and min values of the IGMP latency, an optimal switching point can be calculated for avoiding overlap of unicast and multicast data.

According to embodiments, the delay of the multicast channel must be larger than max network IGMP latency minus min network IGMP latency. Conversely, the last packet of the unicast stream must be transmitted ahead of the first multicast packet by IGMP latency difference (max IGMP latency minus min IGMP latency). These principles ensure that the client receives sufficient data to perform a successful synchronization with the multicast stream, without risking overlapping streams.

If the IGMP latency for a given channel change request is lower than the max latency, the client should discard the redundant stream packets. Moreover, the FCC unicast stream may be sent faster than real time in order to fill the buffer, e.g. 120%. After receiving the unicast stream (burst) for a while, the STB will switch to the FCC multicast stream.

There are different frames in MPEG, so-called I-frames which contain a full picture, P-frames contain incremental extrapolation information, and B-frames contain interpolation information. S-frames are P-frames that have been converted into I-frames. Since B and P frames depend on adjacent frames it is necessary that the STB receives a full I-frame before a new channel can be shown. I-frames, or Intra frames are usually called IDR frames in the case of MPEG-4 part 10, but the principle is the same.

Figure 2:
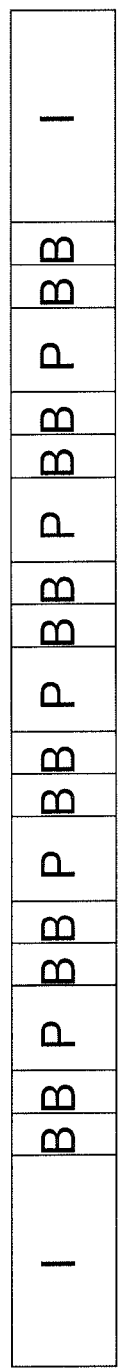
FIG. 2 shows a stream of I, B and P frames according to prior art.

FIG. 2 illustrates a typical sequence of frames. This is not necessarily the order they are transmitted, but rather the order they are displayed.

The size of the different frames illustrates the fact that I-frames are larger than P-frames, which in turn are larger than B-frames. The relative size in the picture is for illustrative purposes; in practice the difference in size is even larger. The I-frame plus the frames between two I-frames is called Group Of Pictures (GOP). The GOP in the above example is 19, but it can be significantly larger. Without a FCC solution a large GOP leads to longer average channel switching times.

An FCC multicast stream can start either with an I-frame or an S-frame. The advantage with using only I-frames is that costly transcoding does not have to be performed. The disadvantage is that the unicast stream has to be active for a longer time.

Figure 3:
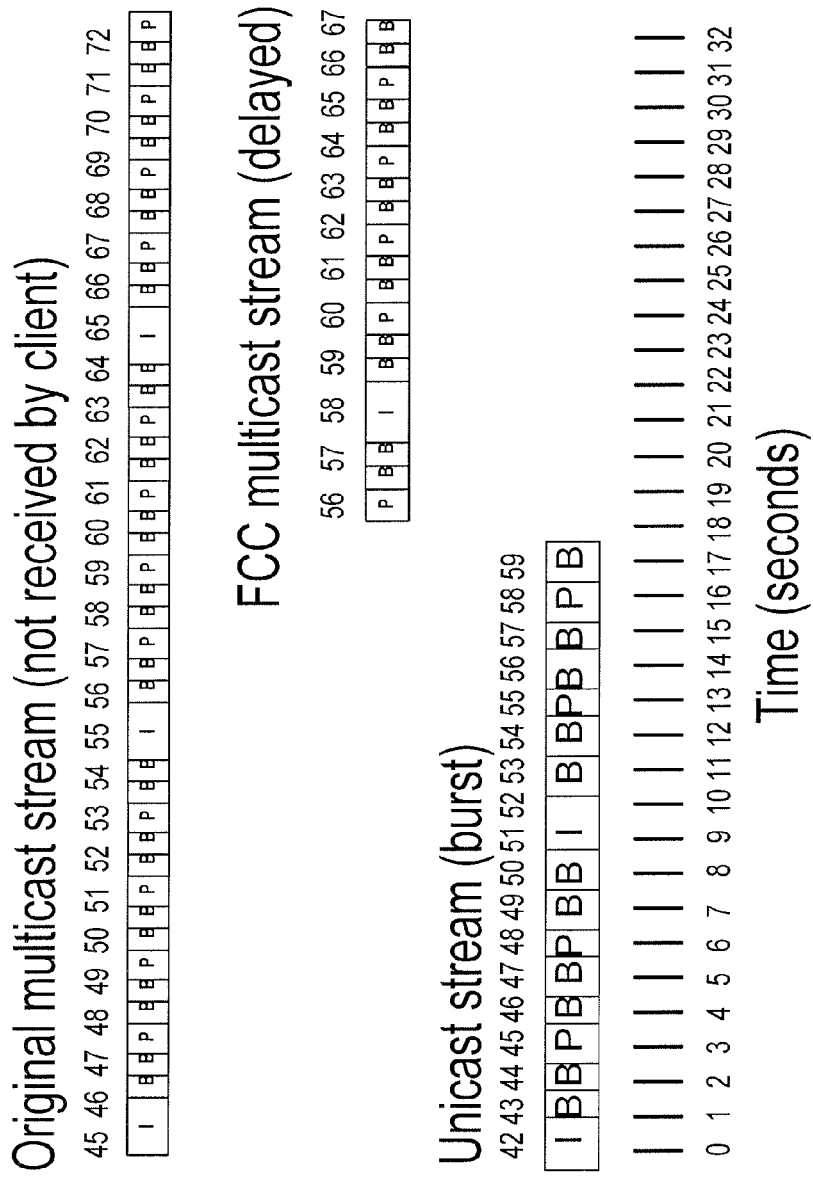
FIG. 3 illustrates the relation between different media streams which are involved in the FCC within the context of embodiments of the present invention.

FIG. 3 illustrates how the different media streams are constructed, and how they relate to each other in time. The FCC multicast stream and the unicast stream are constructed from the original TV multicast channel. It should be noted that the original TV multicast channel is not received by the client. The FCC multicast stream is a time-delayed version of the original multicast channel. In the example of FIG. 3 the unicast stream is also delayed in relation to the original multicast stream. This is not required, but merely a probable circumstance since buffering and retransmitting the original data commonly adds a small delay of the unicast stream in comparison to the original multicast. Any delay of the unicast stream incurred by this circumstance must be taken into account by the FCC Server when either calculating the length of the unicast stream or delaying the original multicast.

In IP-networks the stream content is commonly encapsulated as Transmission Control Protocol (TCP) or User Datagram Protocol (UDP)/Realtime protocol (RTP) packets. Each such packet can be uniquely identified based on different packet properties, such as checksum or packet sequence number. The example in FIG. 3 gives a simplified view that corresponds to RTP encapsulated streams where each packet is identified by a sequence number. Packet sequence numbers are included to indicate the delay of the unicast stream and FCC multicast stream in relation to time and the original stream.

The compressed appearance of the unicast stream indicates that it can be sent faster than the FCC multicast and original streams. This is so that the STB can fill the buffer at the same time it starts to display the video/audio.

According to embodiments of the present invention and as shown by FIG. 3, the FCC multicast stream must be delayed in time so that the last frame of the unicast stream is received sufficiently in advance before the first frame of the delayed multicast is received. In the example above the client will receive a certain amount of redundant data. This is further exemplified by the following example which describes a FCC according to embodiments of the present invention:

1. A channel change event takes place in the STB, e.g. because the user zaps or selects a new channel from an electronic program guide (EPG).

2. The STB finds out which multicast channel to join. This multicast channel corresponds to the delayed version of the original multicast channel, henceforth called FCC multicast as shown in FIG. 3.

3. The STB requests a unicast stream of the FCC multicast channel from the FCC server.

4. The STB starts to fill its buffer from the unicast stream. In conjunction to this event the STB also receives a separate message indicating when the unicast stream will end and when the STB should start to join the FCC multicast channel.

5. When the first I-Frame is received the STB decodes said FCC multicast channel and starts to display video/audio.

6. The STB uses the information received at step 4 to initiate a join with the FCC multicast channel.

7. The server terminates the unicast stream based on the calculated unicast stream length and in a timely manner to avoid overlap with the FCC multicast channel.

8. The STB stops receiving the unicast stream.

9. The STB receives the FCC multicast stream and synchronizes the frames of said FCC multicast channel with the frames of the said unicast stream.

Figure 4:
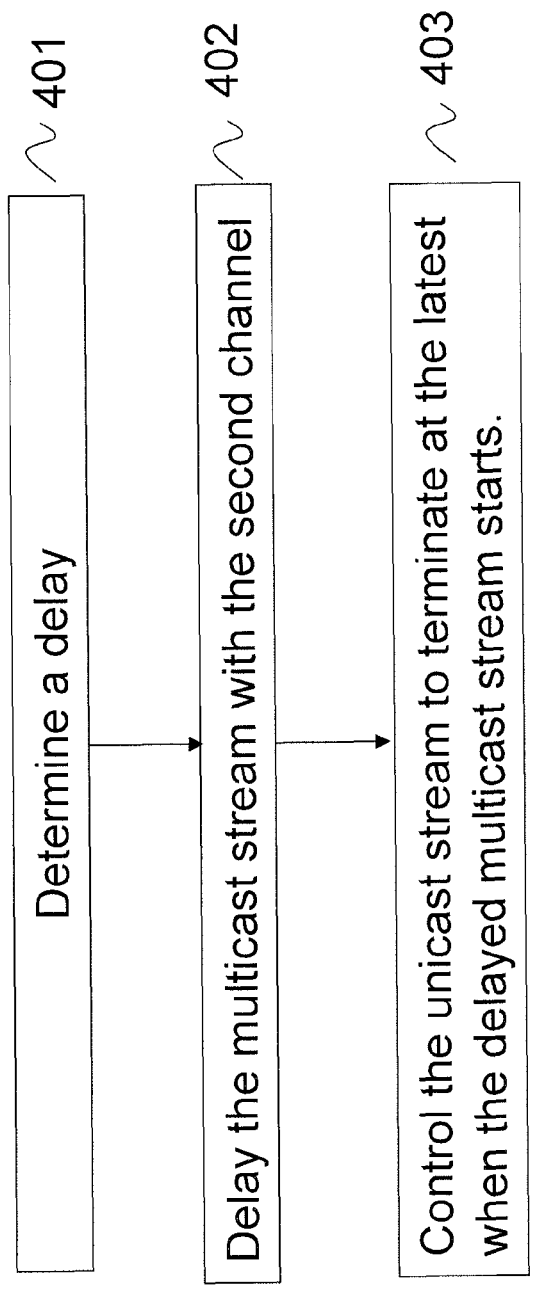
FIG. 4 is a flowchart of the method according to an embodiment of the present invention.

Hence, as illustrated in the flowchart of FIG. 4, in order to avoid overlap of the unicast stream and the FCC multicast stream, a delay of the FCC multicast stream is determined 401 dependent on the at least one network latency. Note, that the delay may not be determined per each channel change. It is however possible to determine the delay per channel change or determine a delay which may be used for a plurality of channel changes occurring during a period of time when the network latency does not change substantially. The FCC multicast stream is delayed 402 with respect to an original multicast stream of said channel with the determined delay. Further, the unicast stream is controlled 403 to terminate at the latest when the delayed FCC multicast stream starts.

According to one embodiment, the delay of the FCC multicast stream is determined based on a minimum network latency and a maximum network latency, e.g. as a difference between the maximum network latency and the minimum network latency. This is further described below and illustrated in FIG. 5a.

According to another embodiment, an error margin is added to the determined delay resulting in a longer delay to be used for delaying the FCC multicast stream with respect to said channel. This is further described below and illustrated in FIG. 5b.

Further, the unicast stream may be controlled to terminate such that a content of said channel is transmitted by either the unicast stream or the FCC multicast stream.

Figure 5:
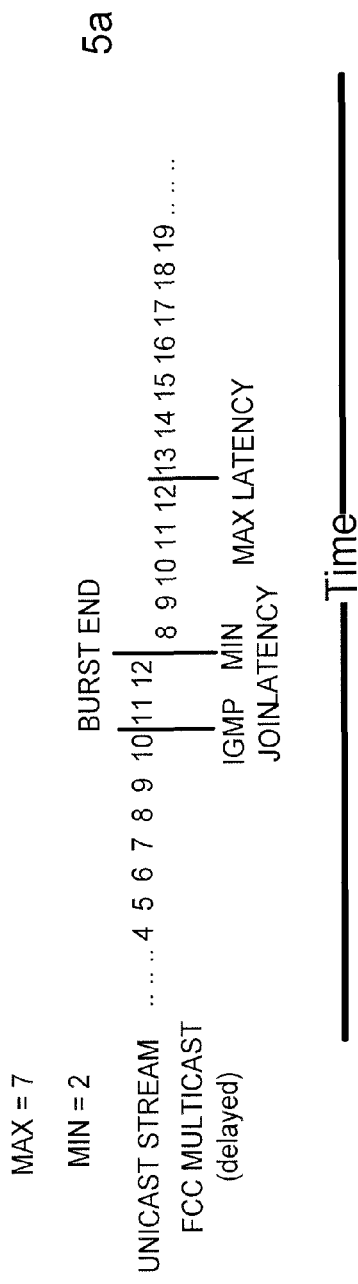
FIG. 5 illustrates how the delay of the FCC multicast stream is determined according to embodiments of the present invention.
Figure 5:
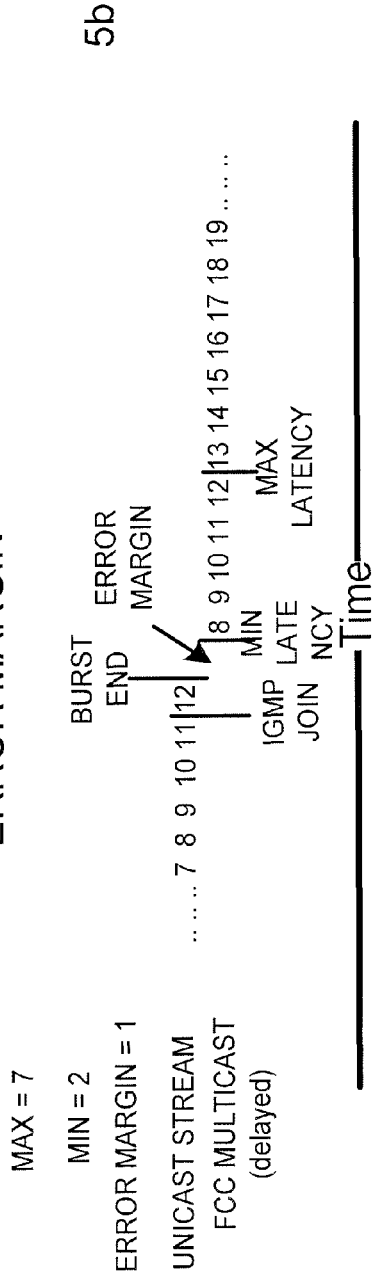

In the ideal scenario the measured IGMP latency values are perfectly accurate, and the risk of overlapping streams due inadequate measurements is non-existent. In such circumstances the necessary delay can be determined by subtracting the IGMP min latency from IGMP max latency as illustrated in FIG. 5a. In practice, it is reasonable to take a certain error margin into account when calculating the appropriate multicast delay as illustrated in FIG. 5b. Depending on the relative importance of avoiding overlapping streams, the error margin can be applied by introducing a gap in time between the last packet of the unicast stream and first packet of the FCC multicast stream. For a given request in practice, the gap between the last unicast stream packet and first multicast packet is a factor of error margin plus max IGMP latency minus actual IGMP latency. If an error margin is applied, the FCC server must provide additional stream data—compensating for the error margin—by extending the unicast stream. This is necessary to avoid that the client receives too little stream data.

The FCC server is configured to calculate the length of the unicast stream. A prerequisite is that the FCC Server knows, by e.g. configuration, the maximum and minimum IGMP latency, and that the FCC multicast stream is delayed by at least the difference of these two values.

The formula to calculate the duration of the unicast stream can be expressed as follows:

$$\text{Unicast stream duration} = (\text{GOP start in relation to original multicast stream} + \text{error margin})/\text{overspeed factor}$$

The GOP start refers to the point in a ring buffer that the unicast stream should start from. The FCC Server determines the appropriate GOP start depending on an overspeed factor and the number of I-frames in the ring buffer at the time the FCC Server receives the FCC request from the client. If there are several I-frames in the ring buffer, selecting a more recent I-frame is preferable since less unicast stream data needs to be transferred. Though, selecting an I-frame that is too close to the live point may limit the extent to which the decoder buffer can be filled faster. Since, with a 1 second decoder buffer, at least 5 seconds of streaming is needed at 20% overspeed. Thus, if the GOP start is not at least 1 second behind the FCC multicast, it will not be possible to fill the whole decoder buffer at overspeed rate. Determining the optimal I-frame i.e. the GOP start is the responsibility of the FCC Server and not within the scope of the embodiments. The embodiments assume that the FCC Server is capable of determining an appropriate GOP start based on the buffered stream data.

If an error margin is applied, the FCC server extends the unicast stream by same criteria needed for when the client is to catch-up with the multicast stream. This effectively means that synchronization point should be shifted to a later point in time corresponding to the extension of the unicast stream in time and the length of the error margin.

The following equation is valid for calculating the multicast delay according to one embodiment as illustrated in FIG. 5b:

$$\text{multicast delay} = \text{max IGMP latency} - \text{min IGMP latency} + \text{error margin}$$

To illustrate a practical example the following values are assumed:

IGMP max latency: 250 milliseconds (ms)
IGMP min latency: 100 ms
Error margin: 50 ms
Multicast delay: 200 ms (250−100+50)

The FCC Server finds a GOP start at 3.5 seconds behind the original multicast. At 20% overspeed (speed by which the unicast stream is sent faster than real-time) the calculated unicast stream time is (3.5+0.05)/0.2=17.75. The FCC server must also calculate when the client should join the FCC server multicast. To ensure that the client does not receive insufficient data, the server must take IGMP min latency into account and the error margin. The time for when the client should join the FCC multicast can be calculated by following equation:

$$\text{synchronization point(time to join FCC multicast)} = \text{unicast stream duration} - \text{IGMP min latency} + \text{error margin}$$

By applying the example values the time to join the FCC multicast stream gives a value of 17.7 s (17.75−0.1+0.05). The server indicates this value to the client via a separate message as described in step 4.

After 17.7 seconds the client sends IGMP JOIN. After 17.75 seconds, the unicast stream reaches the point 200 ms ahead of the FCC multicast. At the same point in time the unicast stream is terminated by the FCC Server.

The STB receives the first data packet of the multicast stream e.g. 175 ms after IGMP JOIN. Thus, in this example the IGMP latency is 175 which means that the STB receives 325 ms of redundant data (250 (max latency)−175 (example latency)+250 (error margin/overspeed factor)). A scenario of max IGMP latency would thus give 250 ms of redundant data, and conversely, a case of min latency would give 400 ms of redundant data.

number of redundant data in ms=IGMP max latency−actual IGMP latency+error margin/overspeed factor The principles of the embodiments with respect to the above example are illustrated in FIGS. 5a and 5b. By adequately calculating the length of the unicast stream in milliseconds, and by delaying the multicast stream based on accurately measured IGMP latency values, the example shown by the FIGS. 5a and 5b that no overlap of unicast and multicast streams occurs.

An important aspect of the solution is the accuracy of the measured max and min IGMP latency. Frequently measuring the IGMP latencies for all or a suitable selection of clients, and providing the measurements to the FCC server allows for continuous fine-tuning of the FCC multicast delay and IGMP JOIN time. Re-configuring the delay of the FCC multicast stream should be done at a suitable point in time to ensure that user experience is not impacted by the change in delay.

To measure the IGMP latency for a specific client the method proposed by the invention is that the client maintains a record of this information. For each request the client compares if the value is smaller than the previously recorded min latency or larger than the previously recorded max latency.

If the client has no record of previous max or min IGMP latency, the client can issue IGMP JOIN and LEAVE requests for all, or a suitable selection of the channels it has access to. The channel change requests (JOIN and LEAVE operations) should be executed in sequential order to avoid excessive bandwidth requirements. During this measurement operation the FCC function should not be utilized.

Before client specific measurements are applied, it is strongly recommended that the recorded max and min latency is based on a sufficient number of IGMP requests. If only a small number of requests have been recorded, there is a risk that the accuracy of the client specific latency values is insufficient. The number of recorded requests that is sufficient in this respect depends on the probability that sufficiently accurate IGMP latency values are recorded given a certain number of IGMP requests.

The IGMP latency measurements can be submitted by the client via Realtime Transport Control protocol (RTCP) reports using vendor specific extensions.

In live IPTV networks it may happen that circumstances change in such way that the IGMP latency values known by the FCC server are inaccurate and needs to be updated. In such scenario it is beneficial if the client reports recurring anomalies during the FCC operation to a receiving node in the network, for example the FCC Server. In most cases the anomalies experienced by the client during the said scenario takes the form of lost packets carrying stream data. By distinguishing reports of packet loss occurred during the FCC operation from packet loss occurring during other events, the FCC Server (or node receiving the reports) may conclude that there is a specific fault in the network related to the FCC service.

The reports for indicating that the lost packets occurred during a FCC operation can be submitted via RTCP reports using vendor specific extensions.

Figure 6:
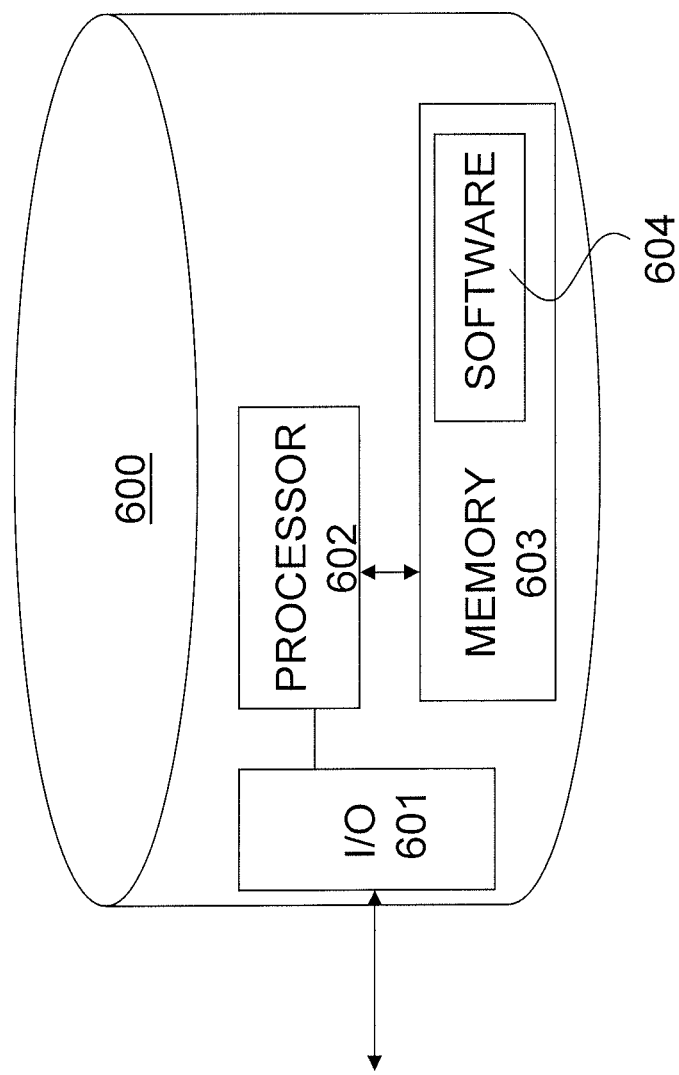
FIG. 6 illustrates schematically an FCC server according to am embodiment of the present invention.

As illustrated in FIG. 6, a FCC server is provided according to one aspect of the embodiments. Hence, a server 600 for fast channel change in an IPTV network is provided, which is also referred to as the FCC server. The server is configured to facilitate a fast channel change to a channel by providing a unicast stream of said channel before joining a FCC multicast stream with said channel and a maximum network latency and a minimum network latency is known. The server 600 comprises a processor 602 configured to determine a delay of the FCC multicast stream dependent on the maximum and the minimum network latency, to delay the FCC multicast stream with respect to an original multicast stream of said channel, and to control the unicast stream to terminate at the latest when the delayed FCC multicast stream starts. The FCC server may also comprise a memory 603 for storing e.g. maximum and minimum values of the network latency.

According to one embodiment, the processor 602 is configured to determine the delay of the FCC multicast stream based on a minimum network latency and a maximum network latency, e.g. as a difference between the maximum network latency and the minimum network latency.

Further, the processor 602 may be configured to add an error margin to the delay to be used for delaying the FCC multicast stream with respect to said channel without increasing the risk that the client receives too little data. Adding an error margin means that the synchronization point is shifted to a later point in time, resulting in a longer unicast stream than without the error margin. Thus, if an error margin is applied, the error margin must be taken into account when calculating the synchronization point according to the principles described by the invention.

In addition, the processor 602 may be configured to terminate the unicast stream such that a content of said channel is transmitted by either the unicast stream or the multicast stream.

The functionalities of the server can be implemented by the processor 602 associated with a memory 603 storing software code portions as illustrated in FIG. 6. The processor runs the software code portions 604 to achieve the functionalities of the server according to embodiments of the present invention.

Moreover, the FCC server is configured to act on FCC requests received from the client and to generate the unicast stream and the FCC multicast stream. The FCC multicast stream is delayed with respect to the original multicast stream according to the embodiments. Further, the FCC server is configured to control the switch between the unicast stream and the FCC multicast stream.

The client may be configured to measure IGMP minimum and maximum latency and to report anomalies occurring during the FCC operation as described above.

The invention claimed is:

1. A method in a server for fast channel change, FCC, in an Internet Protocol TV, IPTV, network, wherein said method facilitates a fast channel change to a channel and comprises:
constructing a unicast stream from an original multicast stream of the channel and facilitating the fast channel change by temporarily providing the unicast stream before starting a FCC multicast stream;
determining a delay in dependence on a difference between a maximum network latency and a minimum network latency associated with joining multicast channels, constructing the FCC multicast stream by delaying the original multicast stream by the determined delay, and
controlling the unicast stream to terminate at the latest when the FCC multicast stream starts.

2. The method according to claim 1, wherein an error margin is added to the determined delay resulting in a longer delay to be used for delaying the FCC multicast stream with respect to said original multicast stream.

3. A server for fast channel change, FCC, in an Internet Protocol TV, IPTV, network, wherein the server is configured to facilitate a fast channel change to a channel and comprises a processor configured to:
construct a unicast stream from an original multicast stream of the channel and facilitate the fast channel change by temporarily providing the unicast stream before starting a FCC multicast stream;
determine a delay in dependence on a difference between a maximum network latency and a minimum network latency associated with joining multicast channels,
constructing the FCC multicast stream by delaying the original multicast stream by the determined delay, and
controlling the unicast stream to terminate at the latest when the FCC multicast stream starts.

4. The server according to claim 3, wherein the processor is configured to add an error margin to the determined delay resulting in a longer delay to be used for delaying the FCC multicast stream with respect to said original multicast stream.

5. A method in a server for fast channel change, FCC, in an Internet Protocol TV, IPTV, network, said method comprising:
initiating transmission of a unicast stream towards a client, in response to the client selecting a new channel, wherein the unicast stream is constructed from an original multicast stream associated with the new channel and where the original multicast stream is not sent to the client;
constructing a delayed version of the original multicast stream, referred to as a FCC multicast stream, by delaying the original multicast stream as a function of the difference between a maximum network latency and a minimum network latency;
calculating a unicast stream duration for transmitting the unicast stream to the client, by dividing first delay value by an overspeed factor of the unicast stream, wherein the first delay value is a delay between a selected Group of Pictures, GOP, start point in the FCC multicast stream relative to the original multicast stream, and wherein the overspeed factor represents an amount by which the unicast stream is transmitted faster than real time;
calculating a synchronization point in time for the client to join the FCC multicast as a difference between the unicast stream duration and the minimum network latency;
signaling the synchronization point to the client, so that the client thereby sends a join request for joining the FCC multicast stream at the synchronization point; and
terminating the unicast stream upon termination of the unicast stream duration and initiating transmission of the FCC multicast stream towards the client responsive to the client sending the join request at the synchronization point.

* * * * *